United States Patent [19]
Massey

[11] 4,011,935
[45] Mar. 15, 1977

[54] SORTING MACHINES

[76] Inventor: John P. Massey, 421 Ruby St., Clarendon Hills, Ill. 60514

[22] Filed: Sept. 8, 1975

[21] Appl. No.: 611,146

[52] U.S. Cl. .............................. 198/365; 198/592; 198/865; 198/866
[51] Int. Cl.² ....................................... B65G 47/64
[58] Field of Search ............... 198/32, 38, 91–94, 198/99, 115, 121, 365, 369, 592, 865, 866; 209/74 R, 125; 212/35 R, 35 HC; 267/72; 271/64

[56] References Cited

UNITED STATES PATENTS

| | | | |
|---|---|---|---|
| 1,251,580 | 1/1918 | Riley | 198/92 X |
| 2,804,192 | 8/1957 | Armstrong et al. | 198/94 |
| 2,834,039 | 5/1958 | Sasse | 267/69 X |
| 3,055,516 | 9/1962 | Mead | 198/32 X |
| 3,056,482 | 10/1962 | Lanham et al. | 198/32 X |
| 3,282,399 | 11/1966 | Morton | 198/35 |
| 3,580,141 | 5/1971 | Richter | 198/32 X |
| 3,805,954 | 4/1974 | Sutton et al. | 198/91 X |

FOREIGN PATENTS OR APPLICATIONS

| | | | |
|---|---|---|---|
| 212,619 | 5/1956 | Australia | 198/94 |
| 1,091,481 | 10/1960 | Germany | 198/45 |

*Primary Examiner*—Evon C. Blunk
*Assistant Examiner*—Richard K. Thomson
*Attorney, Agent, or Firm*—Kinzer, Plyer, Dorn & McEachran

[57] ABSTRACT

A combined sorter and conveyor for articles of considerable bulk or weight, characterized by tandem sections articulated for movement between conveying position and discharge position; shock absorber means cushion the attainment of both positions but offer no resistance during initial movement from one position to the other.

6 Claims, 4 Drawing Figures

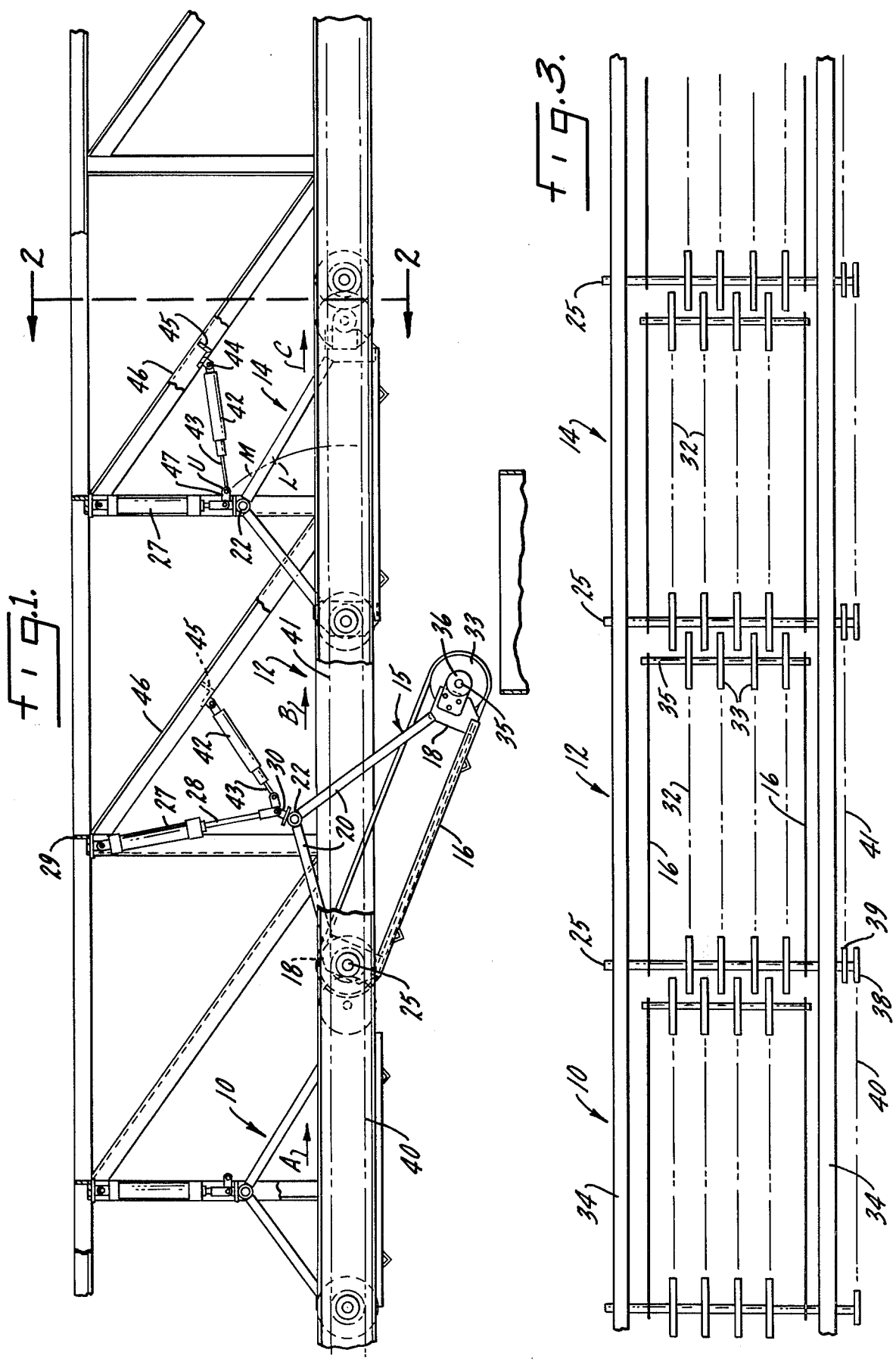

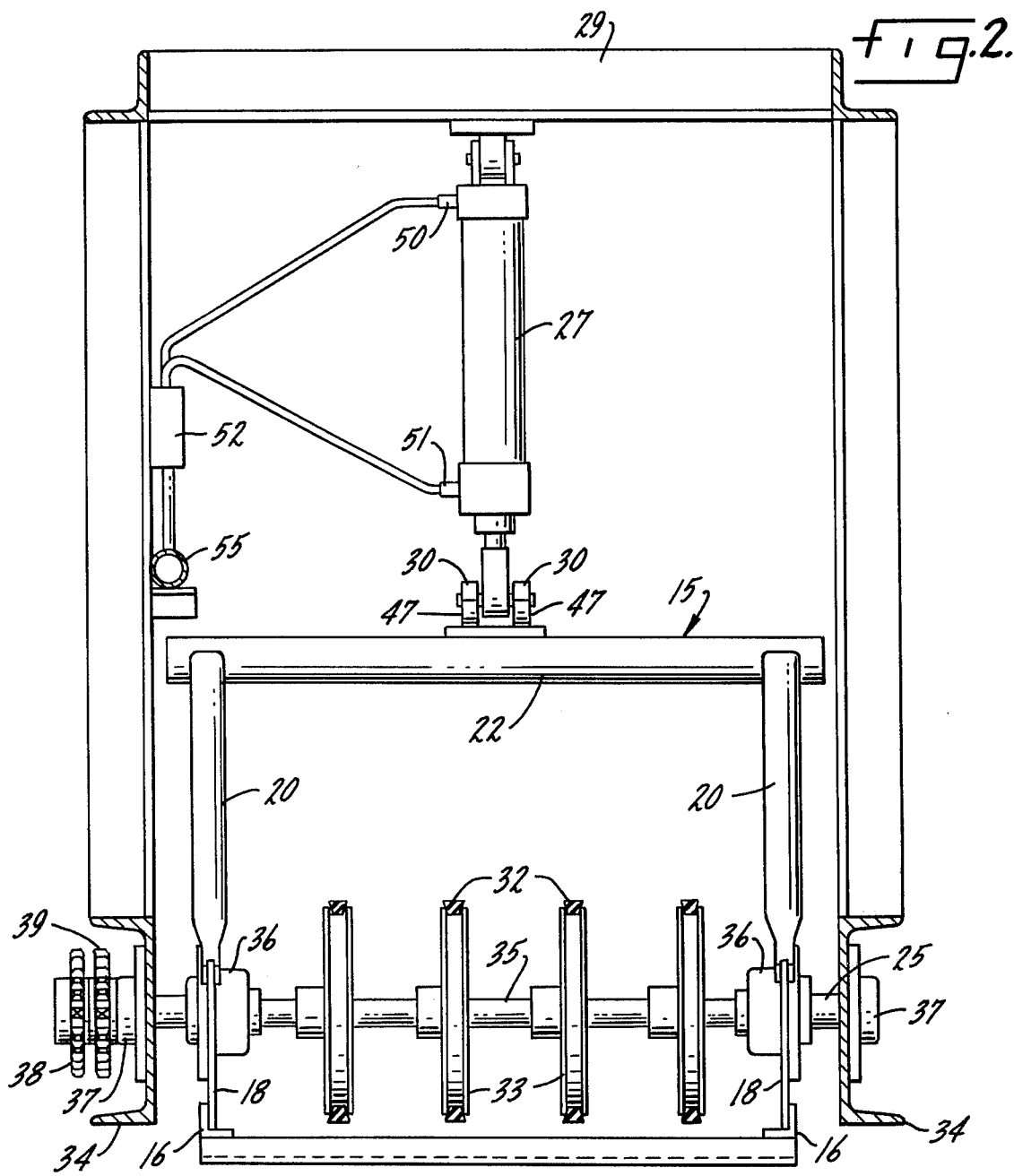
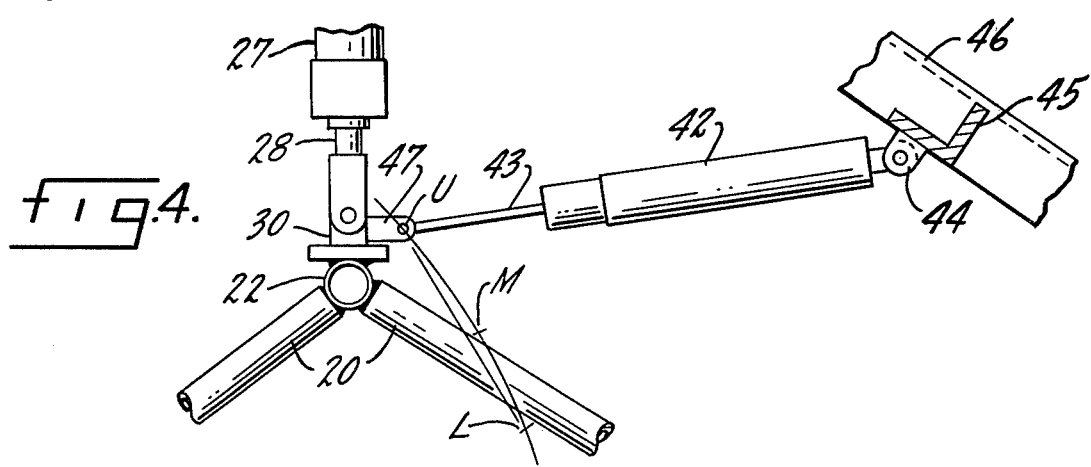

SORTING MACHINES

This invention relates to a combined conveyor and sorting apparatus.

Development of the apparatus of the present invention was prompted principally by the need to sort cumbersome, bulky articles such as catalogues, telephone directories. packaged articles of large size, and the like requiring separation from the standpoint of destination, inventory, size or other quality and so on.

Such sorting apparatus entails equipment of considerable magnitude from the standpoint of the indefinite configuration of articles to be sorted by different users whose needs will vary. Thus it will be appreciated that articles corresponding in size to metropolitan telephone directories or corresponding in weight to packaged automobile accessories could not be sorted in the fashion of sorting sheets, to give an extreme example.

The primary object of the present invention is to develop a sorting machine of large size having the capability of sorting articles of widely variant configuration, characterized in that the machine embodies a series of articulated station frames in tandem relation, each supporting a conveyor of generous width for transporting the articles from one station to the next; the sections are selectively moveable between a conveying position (elevated) to continue the transportation of an article to the next station and a discharge position (depressed) for separating an article from the moving stream and delivering it to a hopper or bin. After delivery, the frame is returned to its conveying position. By such construction, the conveyors may be adequately supported to handle both bulky items and items of considerable weight, and the supporting frames themselves become the sorting gates.

To achieve a satisfactory delivery rate it is necessary that the frames be moved rapidly between the conveying position and the discharge position. Due to the mass of the station frame and the burden it supports, any effort to produce a sudden uncontrolled step will involve both considerable noise and an unacceptable wear factor on the equipment. Accordingly, it is another object of the invention to reduce noise as well as wear on the equipment by harnessing each frame to a shock absorber in such a way that the shock absorber allows full acceleration of the frame at the inception of frame movement, in each direction, but imposes resistance as the frame attains home position in each direction of movement.

More specifically it is an object of the present invention to attain quick response of frame movement by employing selectively operable fluid powered cylinders to reciprocate the station frames between conveying position and discharge position, and to impose resistance by so harnessing each frame to a hydraulic shock absorber that the resistance of the shock absorber is exerted only at the critical time, namely, as the station frame attains home position both in the discharge mode and in the return mode.

In the drawing,

FIG. 1, is a fragmented side elevation of the machine of the present invention;

FIG. 2 is a section on the line 2—2 of FIG. 1;

FIG. 3 is a schematic plan view showing the relation of the station frames and the drive chains; and FIG. 4 is a detail view showing features of the shock absorber.

The combined sorter-conveyor apparatus of the present invention comprises an indefinite number of sections in tandem relation, of which three are shown in FIG. 1, sections 10, 12 and 14. These sections may also be viewed as separate and individual sorting stations.

Each station is more specifically defined by a frame 15, generally rectangular in form and comprising a pair of angle bars 16 having connector plates 18 fastened to the ends thereof. The angle bars are supported and spaced laterally by a pair of front and rear support bars 20 in turn connected to an overhead spacer tube 22.

To enable the station frames 15 to be moved from an elevated horizontal conveyor position to a depressed discharge position, each of the frames is pivotally supported on a shaft 25 constituting the driven member of the conveyor associated with each frame, as will be explained.

To actuate each station frame between the horizontal conveying position and the downwardly inclined delivery position, and in the return direction as well, a reciprocal actuator is provided for each frame, preferably in the form of an air cylinder 27 and associated piston 28. The air cylinder actuator is harnessed at one end to the station frame and at the opposite end to a fixed support against which the cylinder reacts. This is accomplished advantageously by attaching the cylinder pivotally to an overhead frame member 29 and the free end of the piston 28 is pivotally attached to ears 30 secured to the spacer 22. The air cylinders 27 are selectively operable as will be explained.

The conveyor section at each station is of ample width and comprises a plurality of endless belts 32, FIG. 2, arranged between the angle bars 16.

The conveyor belts 32 at one end are trained about idler pulleys 33 supported on an idler shaft 35, in turn rotatably supported in bearing mounts 36 attached to the plates 18 at the free end of each station frame.

To establish an effective support for the stream of articles being transported from one station to the next, the conveyor belts of one section are located between those of the adjacent section in a laterally off-set sense.

To support the station frames above floor level, a pair of channel bars 4 are arranged outboard of the angle bars 16 and the bars are supported in an elevated position by means of up-right posts, not shown, with the driven shafts extended through bearing mounts 37 supported in each of the channel members 4 as shown in FIG. 2.

One end of each driven shaft is provided with two sprocket wheels 38 and 39, FIG. 2. Sprocket 38 is driven by a chain 40; sprocket 39 transmits the drive to the next driven shaft by a chain 41.

The air cylinder imparts rapid movement to a rather heavy frame assembly. Substantial shock forces would ordinarily be involved. To avoid strain on the equipment and to reduce the noise level as an incident to the station frame attaining home position in either direction of movement, a shock absorber mechanism is harnessed to the swinging frame. The shock absorber means nonetheless offers substantially no resistance, except its own friction, to initial movement of the station frame out of home position, and only imposes resistance during the terminal portion of frame movement. By employing this principle, rapid acceleration is permitted during the initial period of frame movement, to develop rapid response to the sorting command, while cushioning or easing the frame into home position compared to a sudden and jarring stop.

The foregoing principle is advantageously achieved by employing a standard automotive shock absorber cylinder 42 and associated piston 43, in which the piston is relieved only in the compression mode. The cylinder 42 is attached pivotally by an attaching ear 44 to a lug 45 welded to an angle brace 46 constituting a fixed support against which the cylinder reacts. The free end of the piston 43 is pivotally attached to the section frame outboard of its pivot, represented by the driven shaft 25, in such a fashion as to undergo a compression stroke during the initial part of frame movement while extending during the terminal portion of frame movement. Thus, as shown in FIG. 1, the free end of the piston 43 is attached to a second attaching ear 47, fastened to the cross bar 22.

The air cylinders 27 are double acting. Each is provided with a pair of fittings 50 and 51 enabling air under pressure to be applied to one side of the piston head inside the cylinder and exhausted at the opposite side. Reversal of air flow is under control of a solenoid operated 4-way valve 52. Air under pressure is admitted to the valve 52 from a conduit 55. The valves 52 are selectively operated in accordance with the sorting program.

The operation of the shock absorber can best be understood with reference to station 14, FIG. 4, as the left-hand end of the shock absorber moves along an arc from the upper position U through the middle (over-center) position M to the lower position L. In the course of this movement, from point U to point M, the piston element of the shock absorber moves inwardly of the cylinder housing in a compression or retraction dynamic stroke and does not retard movement of the frame being depressed. However, as the free end of the piston passes point M and moves on toward point L, the piston is in its extension mode of dynamics and considerable drag is applied. The frame is effectively cushioned. Moving upwardly, the reverse is true; there is little or no drag from point L to point M in the retracting mode but appreciable drag between point M and point U in the extension mode. Piston movement in each direction is only an inch or so in the actual embodiment.

All of the shafts 25 are continuously driven so that the conveyor belts 32 are maintained in continuous motion in the directions indicated by the arrows A, B and C in stations 10, 12 and 14 respectively, at all times when the machine is in operation.

At the commencement of a sorting run, all of the pivotal frames and conveyor sections are in the elevated position as shown for station 10 and station 14. When an article approaching station 12 from station 10 is to be discharged at station 12, the air cylinder 27 is actuated to pivot this section of the conveyor downwardly to the position illustrated for station 12, and the article is delivered to a corresponding sorting bin or hopper. The supporting frame at station 12 must be restored to the elevated home position before the next article reaches station 12, assuming that the next article is to be discharged at some station further down the line, as is likely to be the case.

Typically, the time during which a station frame may be dropped to the depressed home position and then returned in less than 1 second.

What is claimed is:

1. A sorting conveyor apparatus for sorting a variety of articles of indefinite configuration comprising a tandem series of sequentially arranged combination conveyor discharge stations, each station comprising:
   a station frame mounted for movement in two opposed directions between a conveyor position, in which the frame is aligned with the adjacent stations both fore and aft, to convey articles therebetween, and a discharge position in which one end of the frame is displaced from the adjacent station to discharge an article entering the station;
   a conveyor section mounted on the frame and extending longitudinally for substantially the full length of the station frame;
   actuator means for moving the frame between its conveyor position and its discharge position;
   and shock absorber means being connected at one end to the frame and at the other end to a fixed support, said shock absorber means having an extendible and compressible element constructed to offer substantially no resistance to frame movement during initial movement out of one position and up to a predetermined point whereafter said element retards movement of the frame until the other position is reached, in both directions.

2. Apparatus according to claim 1 in which the actuator means comprises an air cylinder and piston harnessed to one end of the frame and reacting at the opposite end on a fixed support.

3. Apparatus according to claim 1 in which the frame is pivotally mounted and in which the shock absorber means is a compression relieved hydraulic cylinder and piston so attached at one end to the frame and at the opposite end to a fixed support that the piston thereof compresses and then extends as the frame swings to its discharge position and vice versa as the frame returns to its conveyor position.

4. Apparatus according to claim 3 in which the actuator means comprises an air cylinder and piston harnessed to one end of the frame and reacting at the opposite end on a fixed support.

5. A sorting conveyor apparatus, comprising a tandem series of sequentially arranged combination conveyor-discharge stations, each station comprising:
   a station frame mounted for movement in two opposed directions between an elevated conveyor position, in which the frame is aligned with the adjacent stations to convey articles therebetween, and a depressed discharge position in which one end of the station frame is displaced from the adjacent station to discharge an article entering the station;
   a conveyor section mounted on the station frame and extending longitudinally for substantially the full length of the station frame;
   actuator means for moving the station frame between its conveyor position and its discharge position; and
   shock absorber means attached to the frame and reacting on a fixed support, said shock absorber means having both an extendable and retractable dynamic mode during movement of the frame in both directions, and said shock absorber means in one of said modes cushioning the terminal portion of movement of the station frame in each of its two directions of movement but without substantial restriction on the initial portion of movement of the station frame in either direction.

6. Apparatus according to claim 5 in which the frame is pivotally mounted and in which the shock absorber means is attached to the frame outboard of the pivot.

* * * * *